US012183528B2

(12) United States Patent
Otsuka et al.

(10) Patent No.: US 12,183,528 B2
(45) Date of Patent: Dec. 31, 2024

(54) ELECTROMAGNETIC RELAY

(71) Applicant: OMRON Corporation, Kyoto (JP)

(72) Inventors: Kohei Otsuka, Yamaga (JP); Ryota Minowa, Yamaga (JP); Hiroyuki Iwasaka, Yamaga (JP); Hiroyuki Harimochi, Kyoto (JP); Shinichi Ogawa, Yamaga (JP); Naoki Kawaguchi, Yamaga (JP)

(73) Assignee: OMRON CORPORATION, Kyoto (JP)

( * ) Notice: Subject to any disclaimer, the term of this patent is extended or adjusted under 35 U.S.C. 154(b) by 204 days.

(21) Appl. No.: 17/782,156

(22) PCT Filed: Nov. 16, 2020

(86) PCT No.: PCT/JP2020/042578
§ 371 (c)(1),
(2) Date: Jun. 2, 2022

(87) PCT Pub. No.: WO2021/124754
PCT Pub. Date: Jun. 24, 2021

(65) Prior Publication Data

US 2023/0005691 A1 Jan. 5, 2023

(30) Foreign Application Priority Data

Dec. 19, 2019 (JP) ................................. 2019-229088

(51) Int. Cl.
*H01H 50/36* (2006.01)
*H01H 50/02* (2006.01)
*H01H 50/14* (2006.01)

(52) U.S. Cl.
CPC ............ *H01H 50/36* (2013.01); *H01H 50/02* (2013.01); *H01H 50/14* (2013.01)

(58) Field of Classification Search
CPC ........ H01H 50/36; H01H 50/02; H01H 50/14; H01H 9/443; H01H 50/546
(Continued)

(56) References Cited

U.S. PATENT DOCUMENTS

2006/0050466 A1 3/2006 Enomoto et al.
2009/0066450 A1* 3/2009 Yano ...................... H01H 49/00 335/203
(Continued)

FOREIGN PATENT DOCUMENTS

CN 1399292 A 2/2003
CN 1701403 A 11/2005
(Continued)

OTHER PUBLICATIONS

The International Search Report of International Application No. PCT/JP2020/042578 issued on Jan. 19, 2021.
(Continued)

*Primary Examiner* — Shawki S Ismail
*Assistant Examiner* — Lisa N Homza
(74) *Attorney, Agent, or Firm* — SHINJYU GLOBAL IP

(57) ABSTRACT

The electromagnetic relay includes a fixed terminal, a movable contact piece, a drive device, a contact case, at least one magnet, and at least one yoke. The fixed terminal includes a fixed contact. The movable contact piece includes a movable contact disposed to face the fixed contact. The drive device moves the movable contact piece in a direction in which the movable contact comes into contact with the fixed contact and in a direction in which the movable contact is separated from the fixed contact. The contact case is made of resin. The contact case houses the fixed contact and the movable contact piece. The at least one magnet is disposed
(Continued)

around the contact case for generating a magnetic field inside the contact case. The at least one yoke is fixed to the contact case.

7 Claims, 5 Drawing Sheets

(58) Field of Classification Search
USPC .......... 335/83
See application file for complete search history.

(56) References Cited

U.S. PATENT DOCUMENTS

| | | | | |
|---|---|---|---|---|
| 2009/0096559 | A1* | 4/2009 | Yano | H01H 50/546 335/187 |
| 2009/0237191 | A1* | 9/2009 | Yano | H01H 50/38 335/202 |
| 2009/0322453 | A1 | 12/2009 | Kawaguchi et al. | |
| 2014/0176268 | A1 | 6/2014 | Suzuki et al. | |
| 2015/0054604 | A1* | 2/2015 | Kubono | H01H 50/20 335/177 |
| 2015/0054605 | A1* | 2/2015 | Kubono | H01H 9/443 335/177 |
| 2016/0181038 | A1* | 6/2016 | Shimizu | H01H 50/42 335/165 |
| 2019/0035585 | A1* | 1/2019 | Minowa | H01H 50/56 |
| 2019/0122844 | A1* | 4/2019 | Minowa | H01H 50/36 |
| 2019/0148095 | A1* | 5/2019 | Minowa | H01H 50/14 335/185 |
| 2019/0304725 | A1 | 10/2019 | Minowa et al. | |
| 2019/0304728 | A1 | 10/2019 | Minowa et al. | |
| 2019/0311871 | A1* | 10/2019 | Minowa | H01H 1/64 |
| 2024/0177956 | A1* | 5/2024 | Zhong | H01H 50/28 |

FOREIGN PATENT DOCUMENTS

| | | | |
|---|---|---|---|
| CN | 110323101 | A | 10/2019 |
| CN | 110323107 | A | 10/2019 |
| JP | 2003-197053 | A | 7/2003 |
| JP | 2012-199120 | A | 10/2012 |
| JP | 5163318 | B2 | 3/2013 |
| JP | 2015-56230 | A | 3/2015 |
| JP | 2015-170531 | A | 9/2015 |
| WO | 2019/026944 | A1 | 2/2019 |

OTHER PUBLICATIONS

The Written Opinion of the International Searching Authority of International Application No. PCT/JP2020/042578 issued on Jan. 19, 2021.

1st Office Action of the corresponding Chinese application No. 202080084919.7 issued on Jul. 19, 2024.

* cited by examiner

ELECTROMAGNETIC RELAY

This application is the U.S. National Phase of International Application No. PCT/JP2020/042578, filed on Nov. 16, 2020. This application claims priority to Japanese Patent Application No. 2019-229088, filed Dec. 19, 2019. The contents of those applications are incorporated by reference herein in their entireties.

FIELD

The present invention relates to an electromagnetic relay.

BACKGROUND

An electromagnetic relay includes a contact case in which a fixed contact, a movable contact, and a movable contact piece are housed (see Japanese Patent No. 5163318). The contact case may expand and deform when the internal pressure inside the contact case rises. Accordingly, in Japanese Patent No. 5163318, the contact case is made of ceramic to ensure the strength of the contact case.

SUMMARY

For example, in order to reduce the manufacturing cost of the contact case, the contact case can be made of resin. However, in the contact case made of resin, it is difficult to secure a strength of the contact case, and when the internal pressure in the contact case rises, the contact case may expand and deform.

An object of the present invention is, in an electromagnetic relay including a contact case made of resin, to improve a strength of the contact case.

An electromagnetic relay according to an aspect of the present invention includes a fixed terminal, a movable contact piece, a drive device, a contact case, at least one magnet, and at least one yoke. The fixed terminal includes a fixed contact. The movable contact piece includes a movable contact disposed to face the fixed contact. The drive device moves the movable contact piece in a direction in which the movable contact comes into contact with the fixed contact and in a direction in which the movable contact is separated from the fixed contact. The contact case is made of resin. The contact houses the fixed contact and the movable contact piece. The at least one magnet is disposed around the contact case for generating a magnetic field inside the contact case. The at least one yoke is fixed to the contact case.

In the electromagnetic relay, the strength of the contact case can be improved by the at least one yoke fixed to the contact case. As a result, when the internal pressure inside the contact case rises, deformation due to expansion of the contact case can be limited.

The at least one yoke may be disposed at least partially in contact with an outer surface of the contact case. In this case, deformation due to the expansion of the contact case can be effectively limited by the at least one yoke.

The at least one yoke may be fixedly press-fitted to the contact case. In this case, the at least one yoke can be rigidly fixed to the contact case.

The at least one yoke may include at least one press-fitting protrusion that protrude in a moving direction of the movable contact piece. The contact case may include at least one press-fitting hole to which the at least one press-fitting protrusion is press-fitted. The at least one press-fitting hole may be provided corresponding to the at least one press-fitting protrusion. In this case, the at least one yoke can be fixed to the contact case with a simple configuration.

The at least one yoke may be disposed so as to surround the contact case. In this case, deformation due to expansion of the contact case can be limited over a wide range of the contact case.

The at least one yoke may each include a middle portion extending in one of a longitudinal direction or a lateral direction of the movable contact piece, and a pair of side portions extending from both ends of the middle portion in the other of the longitudinal direction or the lateral direction of the movable contact piece. The at least one press-fitting protrusion may be provided on at least each of the pair of side portions among the middle portion and the pair of side portions. In this case, the at least one yoke can be rigidly fixed to the contact case at the at least one yoke having the pair of side portions.

The at least one yoke may be made by insert-molding into the contact case. In this case also, the strength of the contact case can be improved by the at least one yoke, and deformation due to expansion of the contact case can be limited.

The fixed terminal may be columnar and extend in the moving direction of the movable contact piece. In this case, in the electromagnetic relay including the columnar fixed terminal, deformation due to expansion of the contact case can be limited.

DETAILED DESCRIPTION

Figure 1:
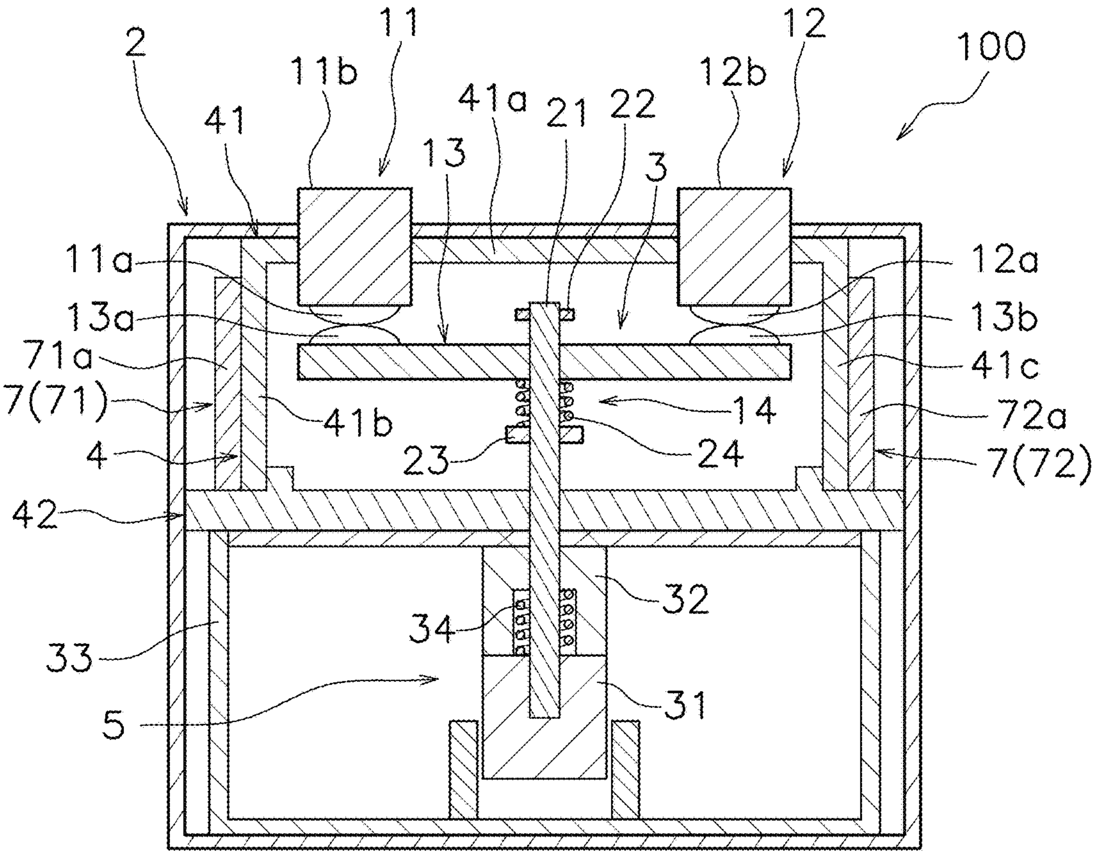
FIG. 1 is a schematic cross-sectional view of an electromagnetic relay.

Hereinafter, an embodiment of an electromagnetic relay according to one aspect of the present invention will be described with reference to the drawings. FIG. 1 is a schematic cross-sectional view of an electromagnetic relay 100. As shown in FIG. 1, the electromagnetic relay 100 includes a housing 2, a contact device 3, a contact case 4, a drive device 5, at least one magnet 6 (see FIG. 2), and at least one yoke 7.

When referring to the drawings, the upper side in FIG. 1 is referred to as "up," the lower side is referred to as "down," the left side is referred to as "left," and the right side is referred to as "right" in order to make the description easier to understand. Further, the back side of the paper in FIG. 1 will be described as "front" and the front side will be described as "back." However, these directions are defined for convenience of description, and do not limit the arrangement direction of the electromagnetic relay 100.

The housing 2 has a substantially quadrangular box shape and is made of an insulating material such as resin. The housing 2 accommodates the contact device 3, the contact case 4, the drive device 5, the at least one magnet 6, and the at least one yoke 7.

As shown in FIG. 1, the contact device 3 includes fixed terminals 11 and 12, a movable contact piece 13, and a movable mechanism 14. The fixed terminals 11 and 12 are columnar terminals and extend in a moving direction of the movable contact piece 13. Here, the fixed terminals 11 and 12 extend in the up-down direction and are fixed to the upper part of the contact case 4. The fixed terminal 12 is disposed at a distance from the fixed terminal 11 in the left-right direction.

The fixed terminal 11 includes a fixed contact 11*a* and an external connecting portion 11*b*. The fixed contact 11*a* is disposed in the contact case 4. The external connecting portion 11*b* protrudes upward from the housing 2 to be exposed to the outside.

The fixed terminal 12 includes a fixed contact 12*a* and an external connecting portion 12*b*. The fixed contact 12*a* is disposed in the contact case 4. The external connecting portion 12*b* protrudes upward from the housing 2 to be exposed to the outside.

The movable contact piece 13 is a plate-shaped member that is long in one direction. Here, the movable contact piece 13 extends in the left-right direction. The movable contact piece 13 is disposed in the contact case 4. In the present embodiment, a longitudinal direction of the movable contact piece 13 coincides with the left-right direction. In addition, a lateral direction of the movable contact piece 13 coincides with the front-back direction.

The movable contact piece 13 includes movable contacts 13*a* and 13*b*. The movable contact 13*a* is disposed to face the fixed contact 11*a* to be able to be in contact with the fixed contact 11*a*. The movable contact 13*b* is disposed to face the fixed contact 12*a* to be able to be in contact with the fixed contact 12*a*. The movable contact 13*b* is disposed at a distance from the movable contact 13*a* in the left-right direction.

The movable contact piece 13 is disposed so as to be movable in a contact direction in which the movable contact 13*a* and 13*b* come into contact with the fixed contacts 11*a* and 12*a* and in a separating direction in which the movable contact 13*a* and 13*b* are separated from the fixed contacts 11*a* and 12*a*. That is, in the present embodiment, the movable contact piece 13 is movable in the up-down direction.

The movable mechanism 14 supports the movable contact piece 13. The movable mechanism 14 is disposed to be movable to a closed position where the fixed contacts 11*a*, 12*a* and the movable contacts 13*a*, 13*b* are in contact with each other, and to an open position where the fixed contacts 11*a*, 12*a* and the movable contacts 13*a*, 13*b* are separated from each other.

The movable mechanism 14 includes a drive shaft 21, a first holding member 22, a second holding member 23, and a contact spring 24. The drive shaft 21 is coupled to the movable contact piece 13. The drive shaft 21 extends in the up-down direction to penetrate the movable contact piece 13 in the up-down direction. The drive shaft 21 is disposed to be movable in the up-down direction.

The first holding member 22 is fixed to the drive shaft 21 at a position above the movable contact piece 13. The second holding member 23 is fixed to the drive shaft 21 at a position below the movable contact piece 13. The contact spring 24 is disposed between the movable contact piece 13 and the second holding member 23. The contact spring 24 forces the movable contact piece 13 in the contact direction via the second holding member 23.

The drive device 5 includes a movable iron core 31, a fixed iron core 32, a yoke 33, and a return spring 34. The drive device 5 further includes a coil and a spool (not shown). The drive device 5 moves the movable contact piece 13 in the contact direction and the separating direction via the movable mechanism 14 by an electromagnetic force. Note that the drive device 5 has a similar configuration as that of the conventional one, and detailed description thereof will be omitted.

The contact case 4 is made of resin. The contact case 4 accommodates the fixed contacts 11*a*, 12*a* and the movable contact piece 13. The contact case 4 includes a case portion 41 and a bottom portion 42. The case portion 41 is disposed on the top of the bottom portion 42.

Figure 2:
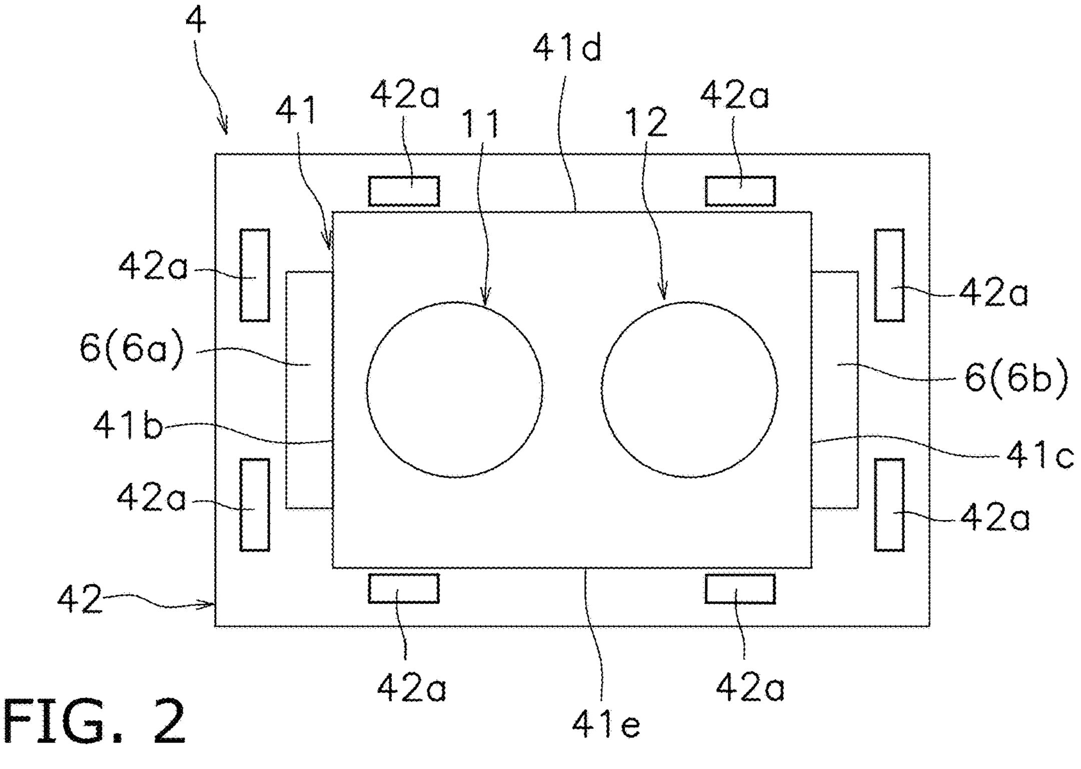
FIG. 2 is a top view of the fixed terminal, the at least one magnet, and the contact case.
Figure 3:
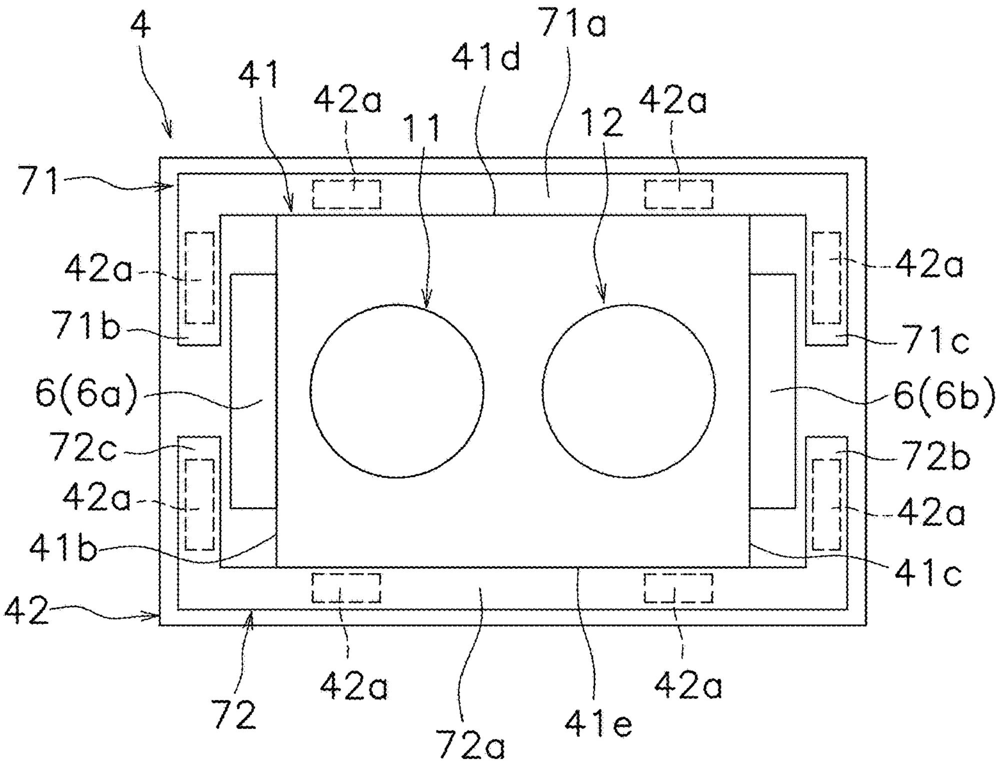
FIG. 3 is a top view of the fixed terminal, the at least one magnet, the at least one yoke, and the contact case.

FIG. 2 is a top view of the fixed terminals 11, 12, the at least one magnet 6, and the contact case 4. FIG. 3 is a top view of the fixed terminals 11 and 12, the at least one magnet 6, the at least one yoke 7, and the contact case 4. FIGS. 2 and 3 are shown without the housing 2. The case portion 41 includes an upper surface 41*a* and first to fourth side walls 41*b* to 41*e*. The upper surface 41*a* has a substantially rectangular shape when viewed from above, and extends in the front-back direction and the left-right direction. Here, the case portion 41 is formed to have a larger dimension in the left-right direction than in the front-back direction. The fixed terminals 11 and 12 penetrate the upper surface 41*a* in the vertical direction. The first to fourth side walls 41*b* to 41*e* are disposed on the front, back, left and right sides of the case portion 41, respectively, and extend from the upper surface 41*a* toward the bottom portion 42. The first side wall 41*b* and the second side wall 41*c* are disposed so as to face each other in the left-right direction. The third side wall 41*d* and the fourth side wall 41*e* are disposed so as to face each other in the front-back direction.

The bottom portion 42 is disposed so as to cover the case portion 41 from below. The bottom portion 42 has a substantially rectangular shape when viewed from above, and extends in the front-back direction and the left-right direction from the case portion 41. The bottom portion 42 has a plurality of press-fitting holes 42*a*. The press-fitting holes 42*a* are disposed to correspond to press-fitting protrusions 71*d* and 72*d*, which will be described later. The press-fitting holes 42*a* are formed to be recessed from the upper surface to the lower surface of the bottom portion 42 at the positions outside the case portion 41. In the present embodiment, two press-fitting holes 42*a* are formed at the positions outside of each of the first to fourth side walls 41*b* to 41*e*.

The at least one magnet 6 is permanent magnet, is disposed around the contact case 4, and generates a magnetic field in the contact case 4. As a result, a Lorentz force acts on an arc that is generated at the contact point, and the arc is extended.

The at least one magnet 6 includes a first magnet 6*a* and a second magnet 6*b*. The first magnet 6*a* and the second magnet 6*b* are disposed so as to face each other in the left-right direction. The first magnet 6*a* is in contact with the outer surface of the first side wall 41*b*. The second magnet 6*b* is in contact with the outer surface of the second side wall 41*c*.

The at least one yoke 7 is fixed to the contact case 4. The at least one yoke 7 is at least partially disposed in contact with an outer surface of the contact case 4. The at least one yoke 7 are disposed so as to surround the contact case 4. The at least one yoke 7 includes a first yoke 71 and a second yoke 72.

Figure 4:
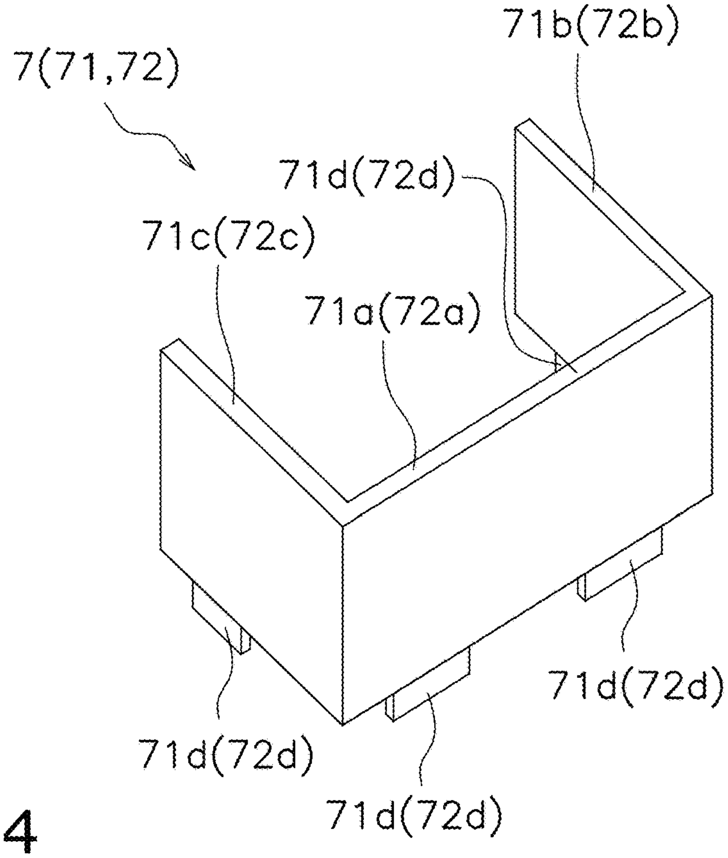
FIG. 4 is a perspective view of the at least one yoke.

The first yoke 71 has a substantially U-shape when viewed from above. Specifically, as shown in FIGS. 3 and 4, the first yoke 71 includes a middle portion 71*a*, a first side portion 71*b*, a second side portion 71*c*, and a plurality of press-fitting protrusions 71*d*. The first side portion 71*b* and the second side portion 71*c* are examples of a pair of sides.

The middle portion 71*a* extends in the front-back direction and the up-down direction. The middle portion 71*a* extends linearly when viewed from above. The middle portion 71*a* is disposed so as to cover the outer surface of the third side wall 41*d*. In the present embodiment, the middle portion 71*a* is disposed in contact with the outer surface of the third side wall 41*d*.

The first side portion 71*b* extends from the left end of the middle portion 72*a* in the front-back direction so as to cover the outer surface of the first side wall 41*b*. The first side portion 71*b* extends to a position where it overlaps with the first magnet 6*a* in the left-right direction and covers a part of the outer surface of the first magnet 6*a*.

The second side portion 71*c* faces the first side portion 71*b* in the left-right direction. The second side portion 71*c* extends in the front-back direction from the right end of the middle portion 71*a* so as to cover the outer surface of the second side wall 41*c*. The second side portion 71*c* extends to a position where it overlaps with the second magnet 6*b* in the left-right direction and covers a part of the outer surface of the second magnet 6*b*.

The press-fitting protrusions 71*d* are fixedly press-fitted to the press-fitting holes 42*a*. The first yoke 71 is fixed to the contact case 4 by the press-fitting of the press-fitting protrusions 71*d* to the press-fitting holes 42*a*. As shown in FIG. 4, the press-fitting protrusions 71*d* are disposed at the lower ends of the middle portion 71*a*, the first side portion 71*b*, and the second side portion 71*c*. The middle portion 71*a* has two press-fitting protrusions 71*d* separated by a distance in the left-right direction. The press-fitting protrusions 71*d* at the middle portion 71*a* are disposed close to both ends of the middle portion 71*a*, respectively. The first side portion 71*b* and the second side portion 71*c* each have one press-fitting protrusion 71*d*.

The second yoke 72 has the same shape as that of the first yoke 71, but is disposed at a place different from that of the first yoke 71. The second yoke 72 is disposed at a distance from the first yoke 71 in the front-back direction. The second yoke 72 includes a middle portion 72*a*, a first side portion 72*b*, a second side portion 72*c*, and a plurality of press-fitting protrusions 72*d*.

The middle portion 72*a* is disposed so as to cover the outer surface of the fourth side wall 41*e*. In the present embodiment, the middle portion 72*a* is in contact with the outer surface of the fourth side wall 41*e*. The first side portion 72*b* extends from the right end of the middle portion 72*a* in the front-back direction so as to cover the outer surface of the second side wall 41*c*. The first side portion 72*b* extends to a position where it overlaps the second magnet 6*b* in the left-right direction and covers a part of the outer surface of the second magnet 6*b*. The second side portion 72*c* extends from the left end of the middle portion 72*a* in the anteroposterior direction so as to cover the outer surface of the first side wall 41*b*. The second side portion 72*c* extends to a position where it overlaps the first magnet 6*a* in the left-right direction and covers a part of the outer surface of the first magnet 6*a*.

The press-fitting protrusions 72*d* are fixedly press-fitted to the press-fitting holes 42*a*. The second yoke 72 is fixed to the contact case 4 by the press-fitting of the press-fitting protrusions 72*d* to the press-fitting holes 42*a*.

In the electromagnetic relay 100 having the above configuration, the strength of the contact case 4 can be improved by the at least one yoke 7 fixed to the contact case 4. As a result, when the internal pressure inside the contact case 4 rises, deformation due to expansion of the contact case 4 can be limited. In the present embodiment in particular, the middle portion 71*a* of the first yoke 71 is disposed in contact with the outer surface of the third side wall 41*d* of the case portion 41, and the middle portion 72*a* of the second yoke 72 is disposed in contact with the fourth side wall 41*e* of the case portion 41. It is disposed in contact with the outer surface. As a result, when the internal pressure inside the contact case 4 rises, deformation due to expansion of the contact case 4 can be effectively limited. Further, the plurality of press-fitting protrusions 71*d* and 72*d* are press-fitted into the plurality of press-fitting holes 42*a* and the at least one yoke 7 is fixed to the contact case 4. As such, the at least one yoke 7 can be firmly fixed to the contact case 4, which further increases the strength of the contact case 4.

One embodiment of the electromagnetic relay according to one aspect of the present invention has been described above, but the present invention is not limited to the above embodiment, and various modifications can be made without departing from the gist of the present invention. For example, the shapes or arrangements of the housing 2, the contact device 3, the contact case 4, the drive device 5, the at least one magnet 6 or the at least one yoke 7 may be changed.

In the above embodiment, the fixed terminals 11 and 12 are columnar, but the fixed terminals 11 and 12 may be plate-shaped terminals extending in the left-right direction or the front-back direction.

In the above embodiment, the contact case 4 has a substantially quadrangular box shape, but it may have any shapes other than the quadrangular box shape, such as a polygonal shape, a columnar shape, or a substantially elliptical column shape.

Figure 5:
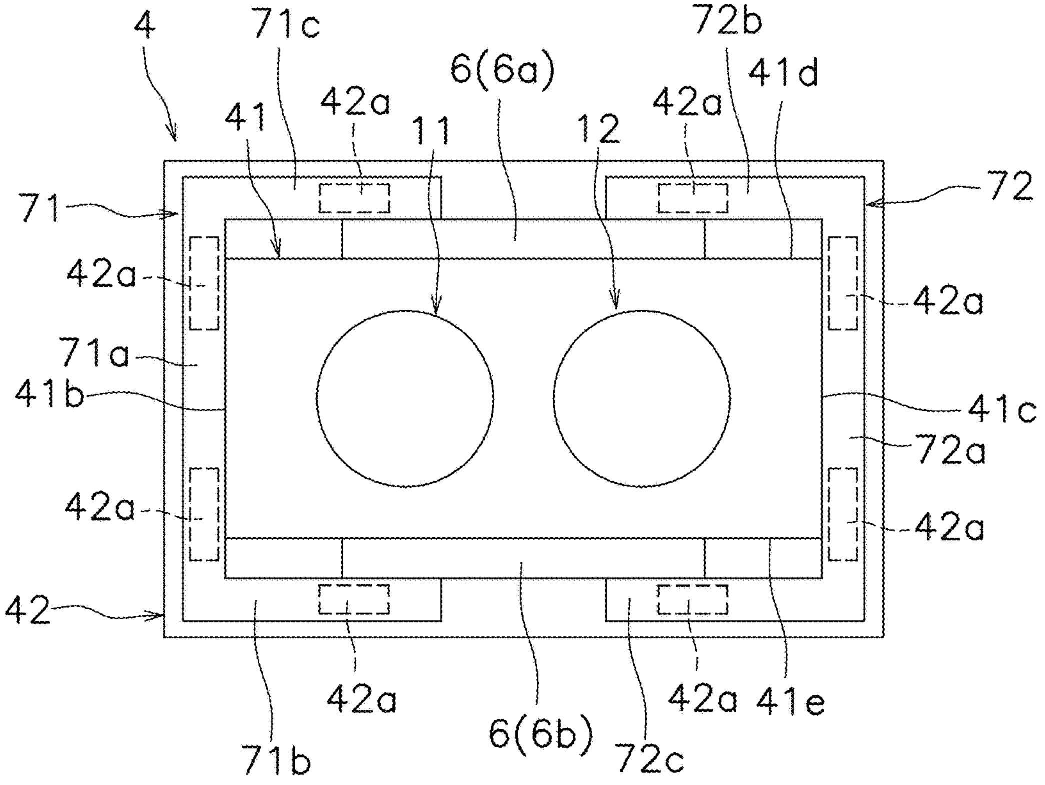
FIG. 5 is a diagram showing a modified example of the arrangement of at least one magnet.

As shown in FIG. 5, the first magnet 6*a* and the second magnet 6*b* may be disposed so as to face each other in the front-back direction. In this case, the middle portion 71*a* of the first yoke 71 may be disposed in contact with the outer surface of the first side wall 41*b*, and the middle portion 72*a* of the second yoke 72 may be disposed in contact with the outer surface of the second side wall 41*c*. Further, the at least one magnet 6 may be single or three or more.

Figure 6:
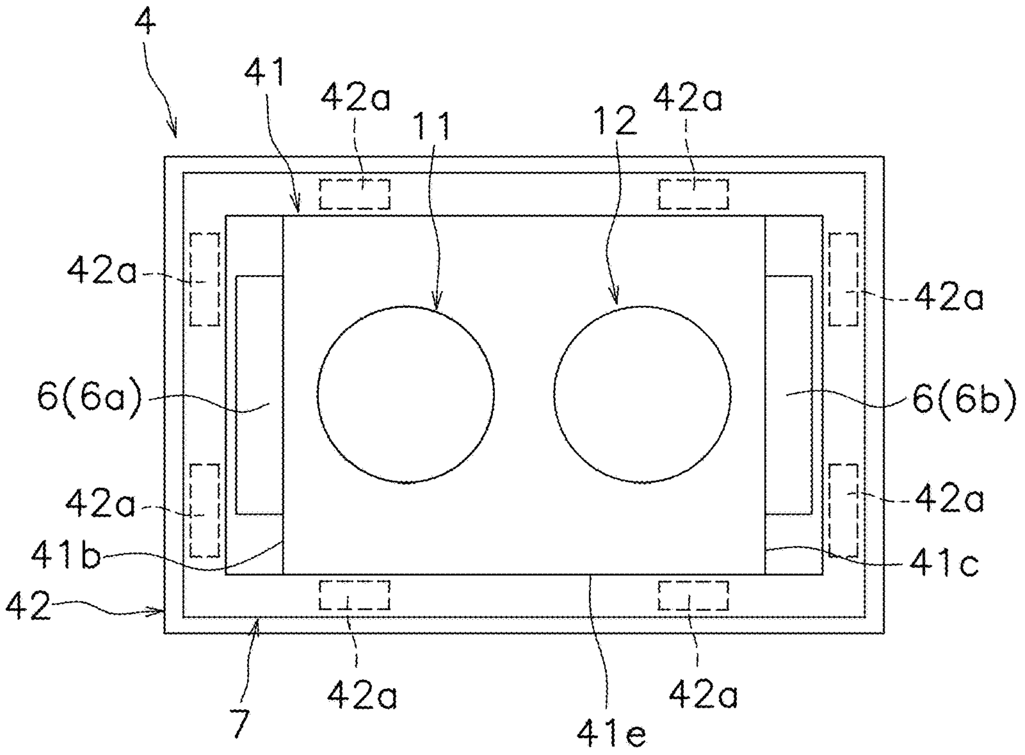
FIG. 6 is a diagram showing a modified example of the at least one yoke.
Figure 7:
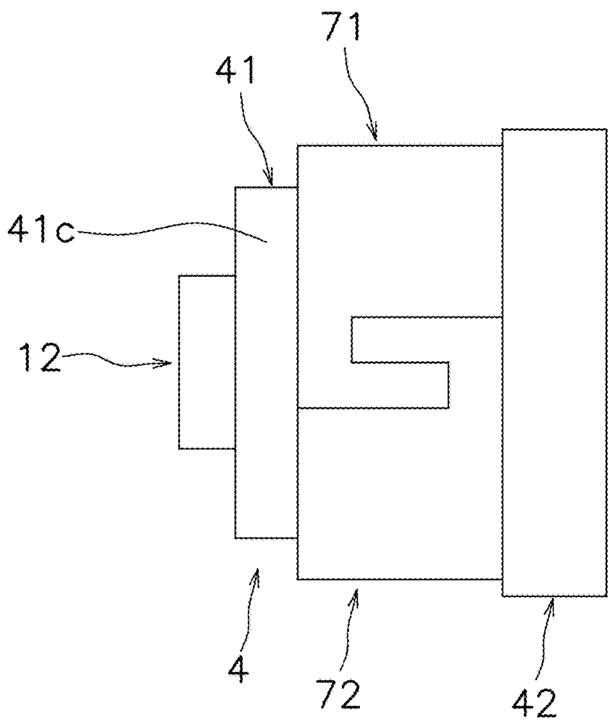
FIG. 7 is a diagram showing a modified example of the at least one yoke.

In the above embodiment, the at least one yoke 7 includes two yokes, the first yoke 71 and the second yoke 72, but the at least one yoke 7 may be single, or three or more. For example, as shown in FIG. 6, the at least one yoke 7 may be integrated and such at least one yoke 7 may surround the entire circumference of the case portion 41. In this case, as shown in FIG. 7, the at least one yoke 7 may be divided into a first yoke 71 and a second yoke 72, and the first yoke 71 and the second yoke 72 may be engaged in a key shape with each other to increase the strength of the at least one yoke 7.

In the above embodiment, the first yoke 71 is disposed in contact with an outer surface of the contact case 4, and the second yoke 72 is disposed in contact with an outer surface of the contact case 4, but the first yoke 71 and the second yoke 72 are not necessarily disposed in contact with the contact case 4. Further, in the above embodiment, the first yoke 71 has a substantially U-shape, but depending on the arrangement or shape of the at least one magnet 6, the first side portion 71*b* and the second side portion 71*c* may be omitted from the first yoke 71. Similarly, the first side portion 72*b* and the second side portion 72*c* may be omitted from the second yoke 72.

Figure 8:
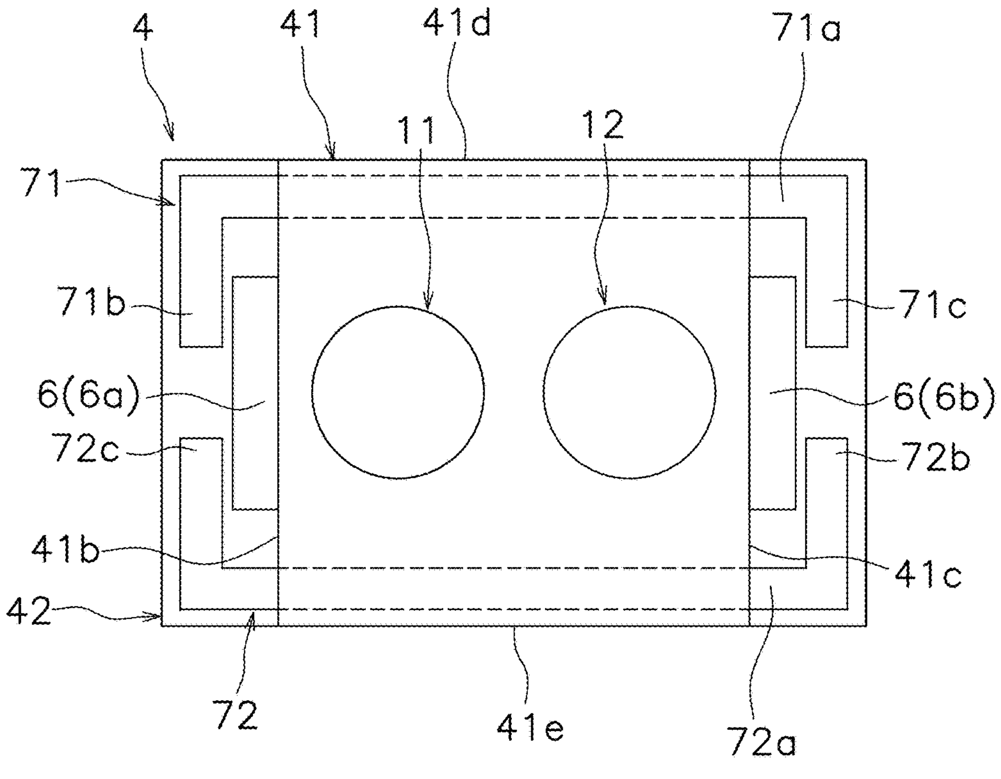
FIG. 8 is a diagram showing a modified example of the contact case.
Figure 9:
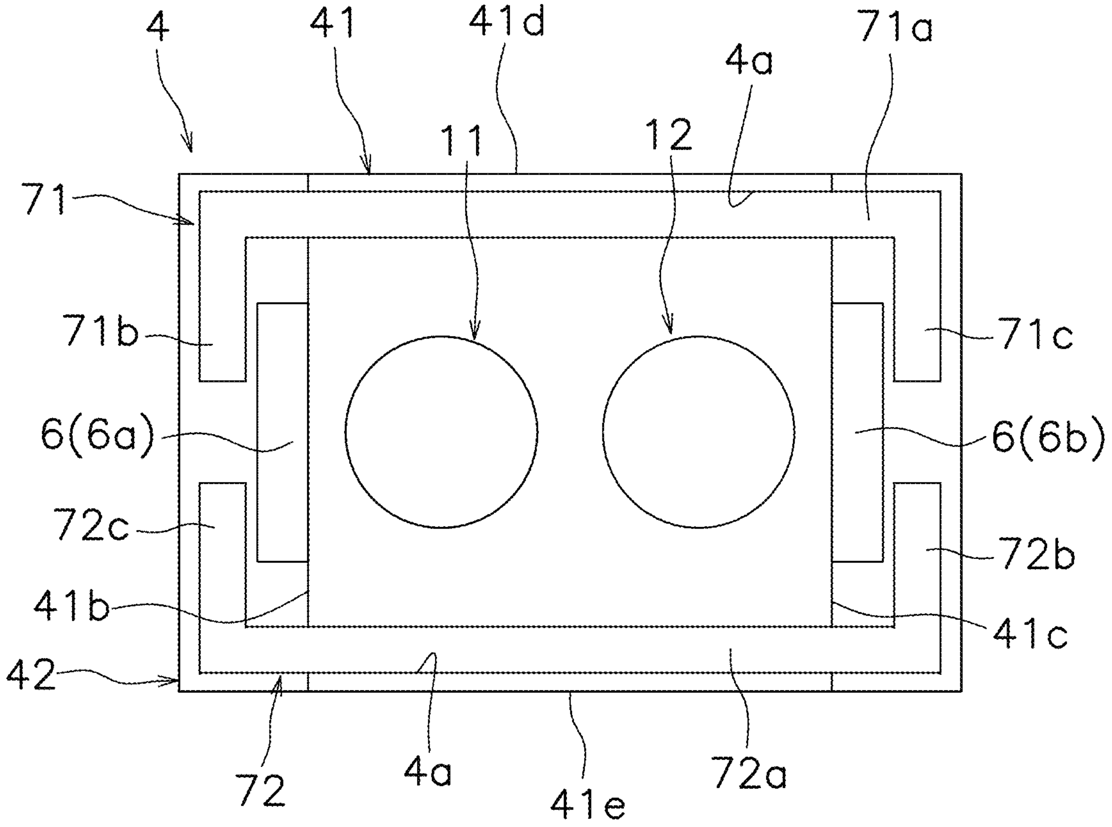
FIG. 9 is a diagram showing a modified example of the contact case.

The means for fixing the at least one yoke 7 to the contact case 4 is not limited to the above embodiment. For example, as shown in FIG. 8, the at least one yoke 7 may be fixed to the contact case 4 by insert molding of the at least one yoke 7 into the contact case 4. Alternatively, as shown in FIG. 9, the contact case 4 may include a groove 4*a* for fitting at least a part of the at least one yoke 7 into the contact case 4, and the at least one yoke 7 may be press-fitted into the groove 4*a* so that the at least one yoke 7 is fixed to the contact case 4. Further, the groove 4*a* and the press-fitting holes 42*a* may be used in combination so that the at least one yoke 7 is fixed to the contact case 4. For example, the middle portions 71*a* and 72*a* may be fixedly press-fitted to the groove 4*a*, and the press-fitting protrusions 71*d* and 72*d* of the first side portions 71*b* and 72*b* may be fixed to the press-fitting holes 42*a*.

REFERENCE NUMERALS

4 Contact case
5 Drive device
6 Magnet
7 Yoke
11, 12 Fixed terminals
11*a*, 11*b* Fixed contacts
13 Movable contact piece
13*a*, 13*b* Movable contacts
42*a* Press-fitting hole
71*a*, 72*a* Middle portions
71*b*, 71*c* Pair of side portions
71*d*, 72*d* Press-fitting protrusions
72*b*, 72*c* Pair of side portions
100 Electromagnetic relay

The invention claimed is:

1. An electromagnetic relay, comprising:
a fixed terminal including a fixed contact;
a movable contact piece including a movable contact disposed to face the fixed contact;
a drive device configured to move the movable contact piece in a moving direction including a direction in which the movable contact comes into contact with the fixed contact and a direction in which the movable contact is separated from the fixed contact;
a contact case in which the fixed contact and the movable contact piece are housed, the contact case being made of resin, the contact case including a side wall extending in the moving direction;
at least one magnet disposed around the contact case, the at least one magnet being configured to generate a magnetic field inside the contact case; and
at least one yoke fixed to the contact case, the at least one yoke including at least one press-fitting protrusion, wherein
the contact case includes at least one press-fitting hole to which the at least one press-fitting protrusion is fixed, the at least one press-fitting hole being provided corresponding to the at least one press-fitting protrusion, and
the yoke is disposed to face the side wall of the contact case in a direction intersecting the moving direction.

2. The electromagnetic relay according to claim 1, wherein
the at least one magnet is disposed outside the side wall of the contact case, and
the at least one yoke is disposed at least partially in contact with an outer surface of the side wall of the contact case.

3. The electromagnetic relay according to claim 1, wherein the at least one yoke is fixedly press-fitted to the contact case.

4. The electromagnetic relay according to claim 1, wherein
the at least one press-fitting protrusion protrudes in the moving direction of the movable contact piece.

5. The electromagnetic relay according to claim 4, wherein the at least one yoke is disposed so as to surround the side wall of the contact case.

6. The electromagnetic relay according to claim 1, wherein the fixed terminal is columnar and extends in the moving direction of the movable contact piece.

7. An electromagnetic relay, comprising:
a fixed terminal including a fixed contact;
a movable contact piece including a movable contact disposed to face the fixed contact;
a drive device configured to move the movable contact piece in a moving direction including a direction in which the movable contact comes into contact with the fixed contact and a direction in which the movable contact is separated from the fixed contact;
a contact case in which the fixed contact and the movable contact piece are housed, the contact case being made of resin;
at least one magnet disposed around the contact case, the at least one magnet being configured to generate a magnetic field inside the contact case; and
at least one yoke fixed to the contact case, the at least one yoke being disposed so as to surround the contact case,
wherein the at least one yoke includes a middle portion extending in one of a longitudinal direction or a lateral direction of the movable contact piece, and a pair of side portions extending from both ends of the middle portion in another of the longitudinal direction or the lateral direction of the movable contact piece, and
the at least one press-fitting protrusion is provided on at least each of the pair of side portions among the middle portion and the pair of side portions.

* * * * *